United States Patent

Schenk

[11] Patent Number: 5,927,068
[45] Date of Patent: Jul. 27, 1999

[54] METHOD AND APPARATUS FOR MONITORING THE FUNCTIONING OF A CATALYTIC CONVERTER

[75] Inventor: Rene Schenk, Tamm, Germany

[73] Assignee: Robert Bosch GmbH, Stuttgart, Germany

[21] Appl. No.: 08/817,662

[22] PCT Filed: Jul. 10, 1996

[86] PCT No.: PCT/DE96/01257

§ 371 Date: Apr. 22, 1997

§ 102(e) Date: Apr. 22, 1997

[87] PCT Pub. No.: WO97/13964

PCT Pub. Date: Apr. 17, 1997

[30] Foreign Application Priority Data

Oct. 11, 1995 [DE] Germany .......................... 195 37 788

[51] Int. Cl.[6] .................................................. F01N 3/00
[52] U.S. Cl. .................. 60/274; 60/276; 60/277
[58] Field of Search .......................... 60/274, 276, 277, 60/286, 301

[56] References Cited

U.S. PATENT DOCUMENTS

| | | | |
|---|---|---|---|
| 5,179,833 | 1/1993 | Kuroda et al. ............................. | 60/277 |
| 5,182,907 | 2/1993 | Kuroda et al. . | |
| 5,341,643 | 8/1994 | Hamburg et al. ......................... | 60/276 |
| 5,472,580 | 12/1995 | Kennard et al. .......................... | 60/277 |
| 5,584,176 | 12/1996 | Meyer et al. .............................. | 60/274 |

FOREIGN PATENT DOCUMENTS 44 41 261  5/1996  Germany .

*Primary Examiner*—Thomas E. Denion
*Attorney, Agent, or Firm*—Kenyon & Kenyon

[57] ABSTRACT

A method and an apparatus are described for monitoring the functioning of a catalytic converter, particularly an oxidation catalytic converter and/or a reduction catalytic converter of a self-ignition internal combustion engine. A sensor is provided which generates an output signal that indicates the proportion of hydrocarbons in the exhaust gas. A defect of the catalytic converter is recognized as a function of the output signal of the sensor.

10 Claims, 4 Drawing Sheets

METHOD AND APPARATUS FOR MONITORING THE FUNCTIONING OF A CATALYTIC CONVERTER

FIELD OF THE INVENTION

The present invention relates to a method and an apparatus for monitoring the functioning of a catalytic converter.

BACKGROUND INFORMATION

A method and an apparatus for monitoring a catalytic converter are known from U.S. Pat. No. 5,182,907. A sensor is arranged in front of and behind the catalytic converter, in each instance, to detect the proportion of hydrocarbons in the exhaust gas. A defect of the catalytic converter is recognized on the basis of a comparison between the hydrocarbon content in front of and behind the catalytic converter. A disadvantage here is that two sensors are required.

The exhaust gases of self-ignition internal combustion engines tend to produce high NOx emissions, because of the fact that they are operated with a great excess of air. This occurs to an even greater degree in internal combustion engines with direct fuel injection into the combustion space. A reduction catalytic converter can be used to reduce these emissions. To reduce the NOx levels, additional fuel is metered in ahead of the catalytic converter, and this fuel is converted in the catalytic converter.

Furthermore, it is provided that in the case of diesel engines, the exhaust gas is subsequently treated by an oxidation catalytic converter. This makes it possible to clearly lower the hydrocarbon emissions (HC emissions). Such a method of procedure is described, for example, in German Patent No. 4441261.

In the United States, so-called On-Board-Diagnosis (OBD) is required. This means that certain components are constantly monitored, and defects, particularly a deterioration in the exhaust gas emission values of the engine, are reported to the driver. For the NOx catalytic converter, monitoring is required because of the amount of fuel that is metered in.

SUMMARY OF THE INVENTION

The present invention is based on the task of making available a diagnosis method and a diagnosis device which can diagnose a decrease in effect both for an oxidation catalytic converter and for a NOx catalytic converter, with little effort.

With the method of procedure according to the present invention, it is possible to recognize a decrease in effect of the catalytic converters, while they are in operation.

DETAILED DESCRIPTION

Figure 1:
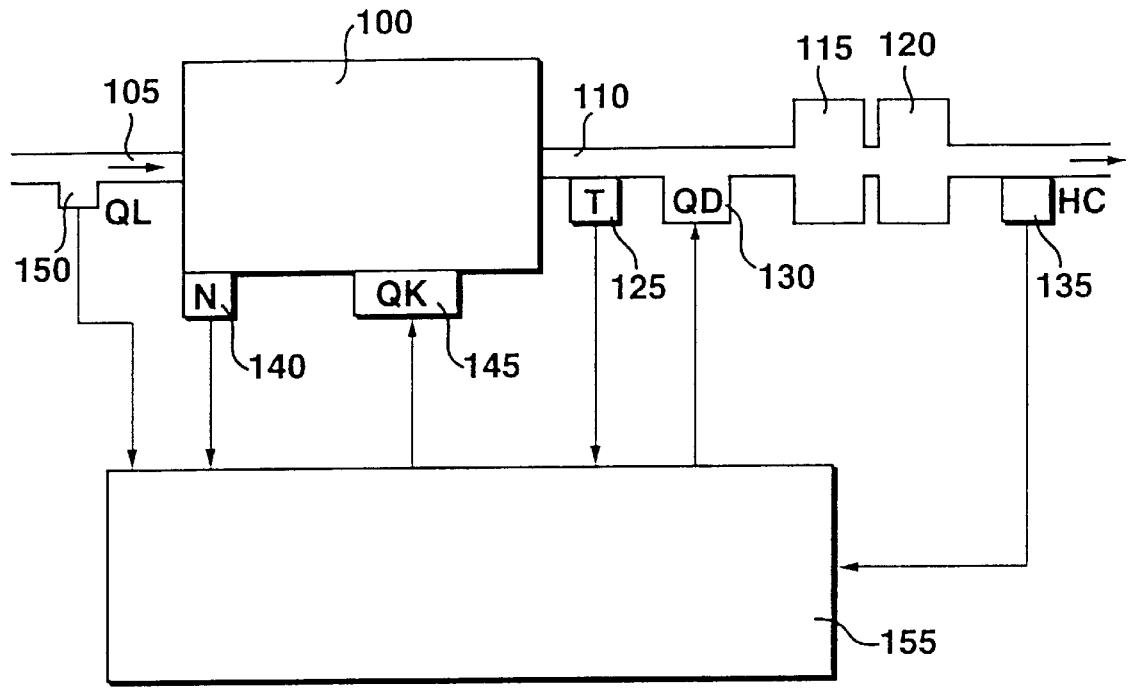
FIG. 1 shows an overall view of the internal combustion engine and the catalytic converter.

In FIG. 1, an internal combustion engine 100 is shown schematically. This is preferably a self-ignition internal combustion engine. Fresh air is supplied to the internal combustion engine via an intake line 105, and the exhaust gases of the internal combustion engine are passed away via an exhaust gas line 110. A reduction catalytic converter 115 as well as an oxidation catalytic converter 120 are arranged in the exhaust gas line. It is particularly advantageous if the two catalytic converters form a structural entity.

A temperature sensor 125 detects the exhaust gas temperature T. By means of a metering device 130, an amount QD of fuel which is dependent on operating variables can be supplied to the exhaust gas. Furthermore, a hydrocarbon sensor 135 (HC sensor) is provided, which detects the proportion of uncombusted hydrocarbons (HC) in the exhaust gas. This sensor 135 yields a signal which corresponds to the proportion of hydrocarbons.

A speed of rotation sensor 140 detects the speed of rotation N of the internal combustion engine 100. A fuel metering unit 145 meters a pre-determined amount QK of fuel into the internal combustion engine 100.

A sensor 150 detects the amount QL of air taken in. A control unit 155 processes the signals which come from the sensors 125, 135, 140, and 150. The control unit 155 in turn acts on the fuel metering unit 145 as well as the metering device 130 by means of control signals.

Depending on various operating variables such as the speed of rotation N and the driver's wishes, the control unit 155 calculates an amount QK of fuel to be injected, which acts on the fuel metering unit 145. This unit meters a corresponding amount of fuel into the internal combustion engine 100. This fuel is combusted in the internal combustion engine 100, together with the amount QL of air which was supplied. The resulting exhaust gases contain nitrous oxides NOx, for one thing, as well as uncombusted hydrocarbons HC.

These components are converted into harmless compounds such as $CO_2$ and $H_2O$ in the two catalytic converters 115 and 120. To reduce the NOx, it is necessary that a certain amount of hydrocarbons HC be added to the exhaust gas. This can be done, for example, by means of the metering device 130. For this purpose, the control 155 unit calculates the metering amount QD which is required, and controls the metering device 130 accordingly.

If the oxidation catalytic converter 120 is functioning insufficiently, an increased proportion of uncombusted hydrocarbons occurs in the exhaust gas behind the catalytic converter. Analogously, if the reduction catalytic converter 115 is defective, the amount of fuel metered in is no longer converted, which also results in elevated hydrocarbon emissions. These hydrocarbons can be detected in the exhaust gas by means of the hydrocarbon sensor 135.

Monitoring of the catalytic converters by means of the HC sensor 135 is made more difficult by the fact that in certain operating states, elevated hydrocarbon emissions occur in the exhaust gas although the catalytic converters are fully functional.

These short-term hydrocarbon emissions are not allowed to result in a defect report. Furthermore, monitoring is only allowed to take place when the catalytic converter is active.

According to the present invention, the method of procedure is now as follows:

The method is used to recognize that the catalytic converter is intact. This has proven to be advantageous as compared to the method of recognizing that the catalytic converter is defective. Furthermore, an integral measurement is carried out, since this reduces the influence of short-term irregularities.

Figure 2:
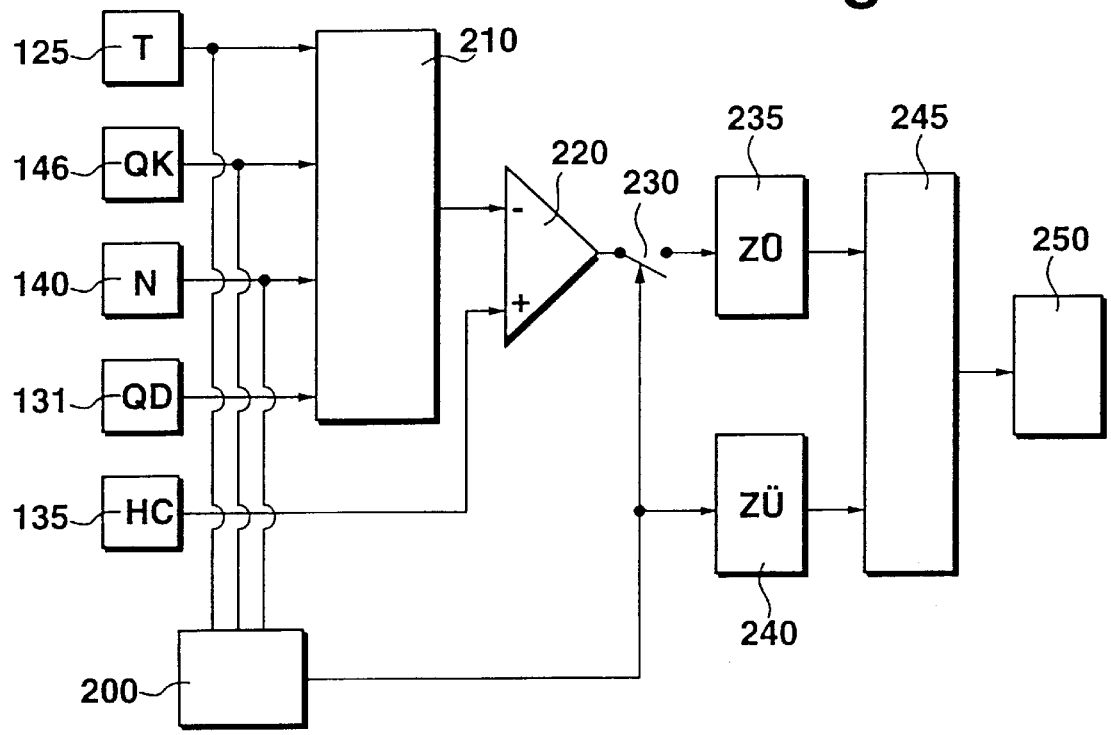
FIG. 2 shows a block schematic according to the present invention.

An embodiment of the monitoring device is shown in FIG. 2. Elements which were already described in FIG. 1 are marked with the corresponding reference symbol. The output signals of the temperature sensor 125, the speed of rotation sensor 140, and the amount setting device 146 are passed to a working range recognition device 200.

The amount setting device 146 issues the signal QK, which determines the amount of fuel QK to be injected, and with which the fuel metering unit 145 is controlled. Alternatively, other amount signals which are present in the control unit 155 can be used. These signals, as well as the output signal QD of the metering amount setting device 131, are passed to a characteristics field 210. The output signal of the characteristics field 210 reaches the negative input of a comparator 220. The output signal of the hydrocarbon sensor 135 is applied to the positive input of this comparator 220.

The output signal of the comparator 220 is connected with a counter 235 via a switching means 230. The working range recognition device 200 applies a signal to the switching means 230 and a counter 240. The output signals of the counters 235 and 240 are passed to a processing unit 245, which in turn acts on an error display 250. The error display 250 can be, for example, a warning light which tells the driver that the catalytic converter is defective. Alternatively, this can also be a memory element which stores the error in memory and is read at some later time, for example when the vehicle is serviced in a workshop.

Figure 3:
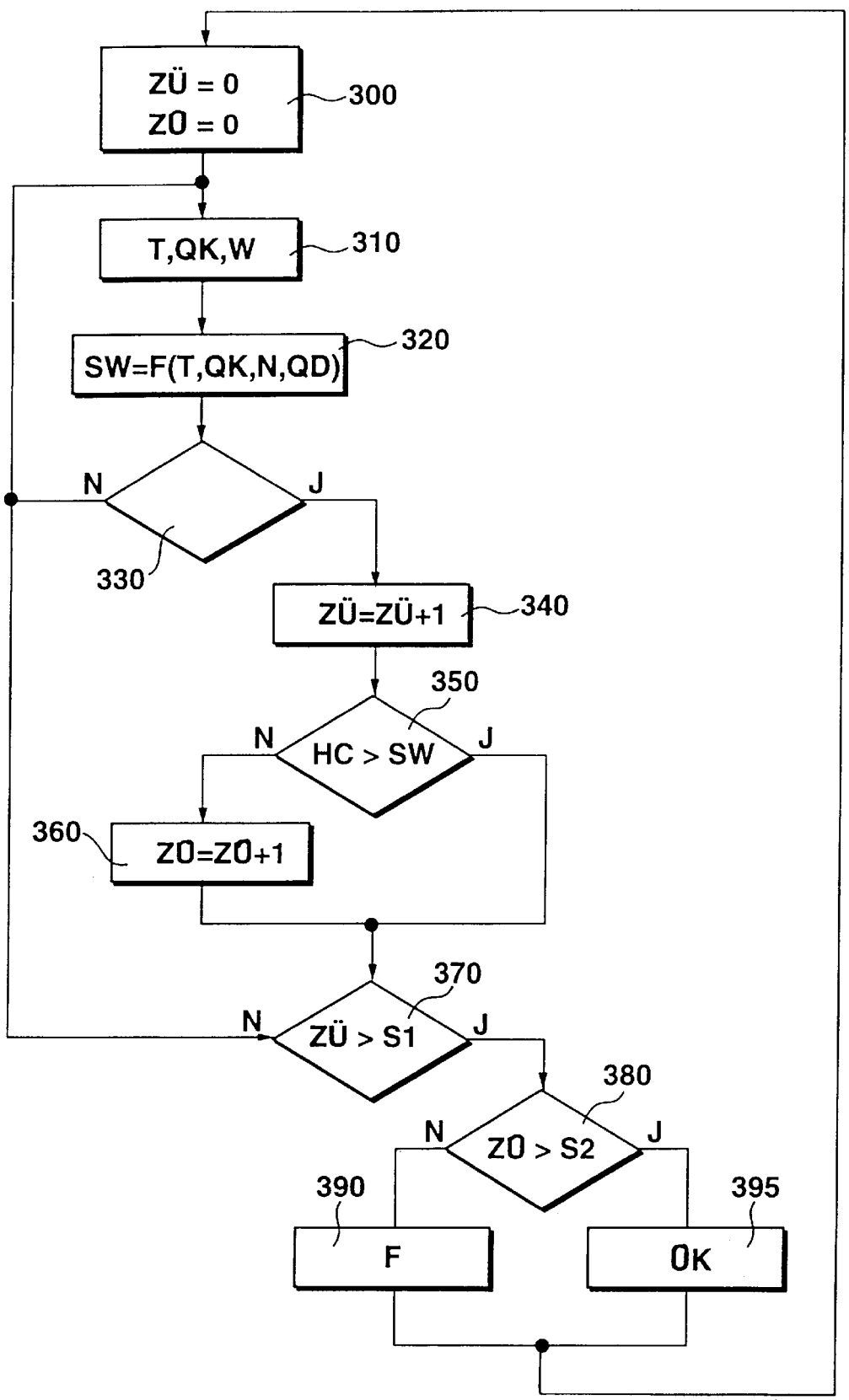
FIG. 3 shows a flow diagram of a first embodiment, according to the present invention.

The method of functioning of this device is described using the flow diagram in FIG. 3. In a first step 300, the counter status ZÜ of the counter 240 and the counter status ZO of the counter 235 are set to 0. In the subsequent step 310, the various operating parameters such as the exhaust gas temperature T, the amount QK of fuel to be injected, and the speed of rotation N are detected.

In step 320, the threshold value SW is read out of the characteristics field 210. In the characteristics field 210, the threshold value is dependent on at least one of the variables, i.e. the exhaust gas temperature T, the amount QK of fuel to be injected, the speed of rotation N, and/or the metering amount QD.

Proceeding from the exhaust gas temperature T, the amount QK of fuel to be injected, and the speed of rotation N, the working range recognition device 200 checks, in step 330, whether an operating range is present in which monitoring of the catalytic converter is possible. If no such operating state is recognized, the method continues with program step 310. If an operating state such that monitoring is practically possible is recognized, the counter status ZÜ of the counter 240 is increased by one. The counter status corresponds to the time duration within which monitoring is possible.

Monitoring is possible if the temperature T exceeds a minimum temperature. Furthermore, the amount QK of fuel injected, and/or the metering amount QD, must exceed a minimum value.

Subsequently, the comparator 220 checks, in step 350, whether the output signal HC of the hydrocarbon sensor 135 is greater than the threshold value SW. If this is not the case, the counter status ZO of the counter 235 is increased by one. The counter status ZO corresponds to the time duration during which the catalytic converter is recognized as being intact.

If the signal HC is greater than the threshold value, i.e. subsequent to step 360, the inquiry device 370 checks whether the counter status ZÜ of the counter 240 is greater than a threshold value S1. If this is not the case, step 310 occurs again.

If the counter status ZÜ is greater than the threshold value S1, an inquiry device 380 checks whether the counter status ZO is greater than a second threshold value S2. If this is not the case, a defect is detected in step 390; if the counter status is greater than or equal to the threshold value S2, then it is found, in step 395, that there is no defect. Subsequently, the program ends and is not initialized again until the next time the engine is started. Alternatively, it can also be provided that the program starts again with step 300.

The time counter 240 counts the time during which monitoring is practically possible. Furthermore, the current hydrocarbon value of the HC sensor 135 is compared with a limit value SW. As long as the value of the HC sensor 135 is less than the limit value, and if the catalytic converter is in the monitoring range, the time is counted in a second counter 235. This time corresponds to the time during which the catalytic converter is functioning properly. The processing logic 245 compares the monitoring time counter 240 with a limit value. If this limit value is exceeded, the counter 235 is also read out. If its value is above a minimum value, the catalytic converter is functioning properly.

In a simplified embodiment, it can also be provided that a fixed threshold value SW is used. In addition, other operating characteristics such as the air mass or the beginning of injection, which are also present in the control unit 135, can be used to form the threshold value SW.

Figure 4:
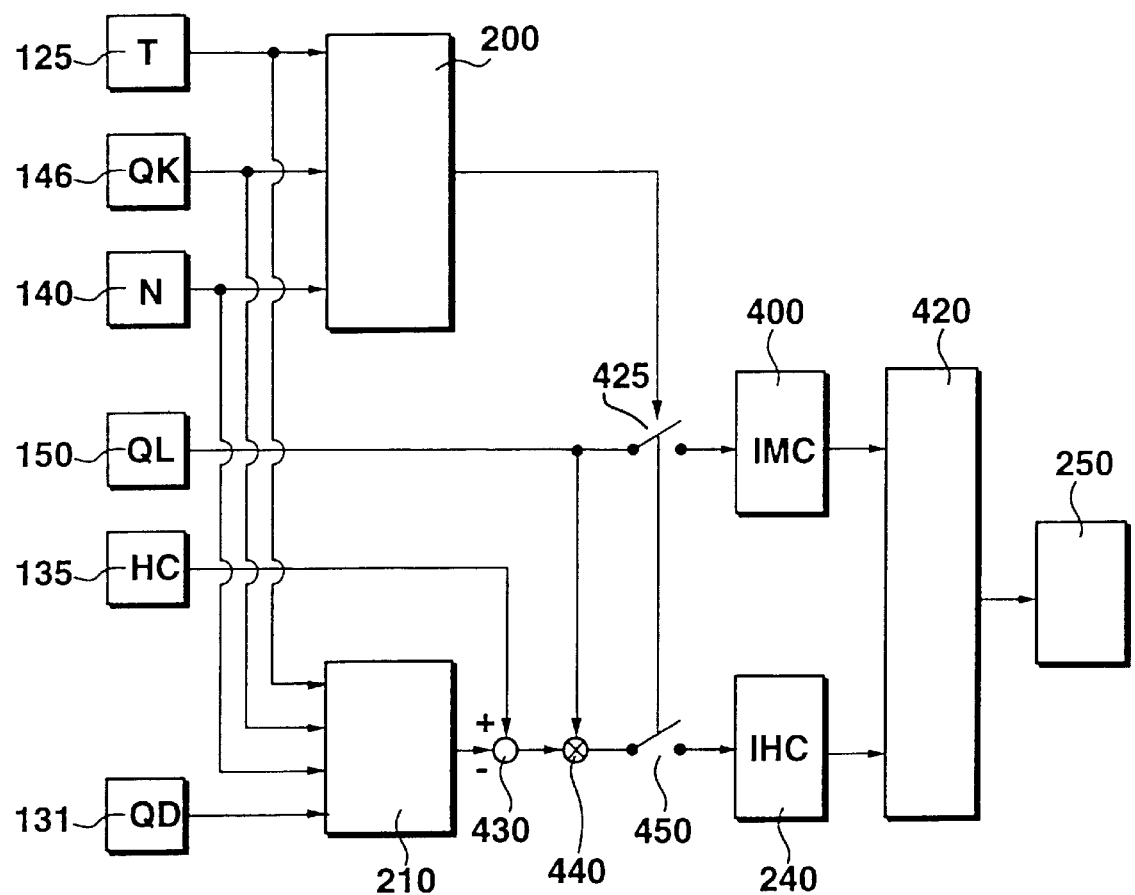
FIG. 4 shows a block schematic according to the present invention.

FIG. 4 shows another form of the method of procedure according to the present invention, by means of amount-oriented monitoring. Elements which have already been described are marked with the corresponding reference symbols. The output signal of the characteristics field 210 reaches an integrator 410 via a linking point 430, a linking point 440, and a switch 450. The output signal of an air amount meter 150 reaches an integrator 400 via a switching means 425.

The output signals of the two integrators 400 and 410 are evaluated by a processing unit 420, which then controls the error display 250. The switching means 425 and 450 are controlled by the working range recognition device 200.

Figure 5:
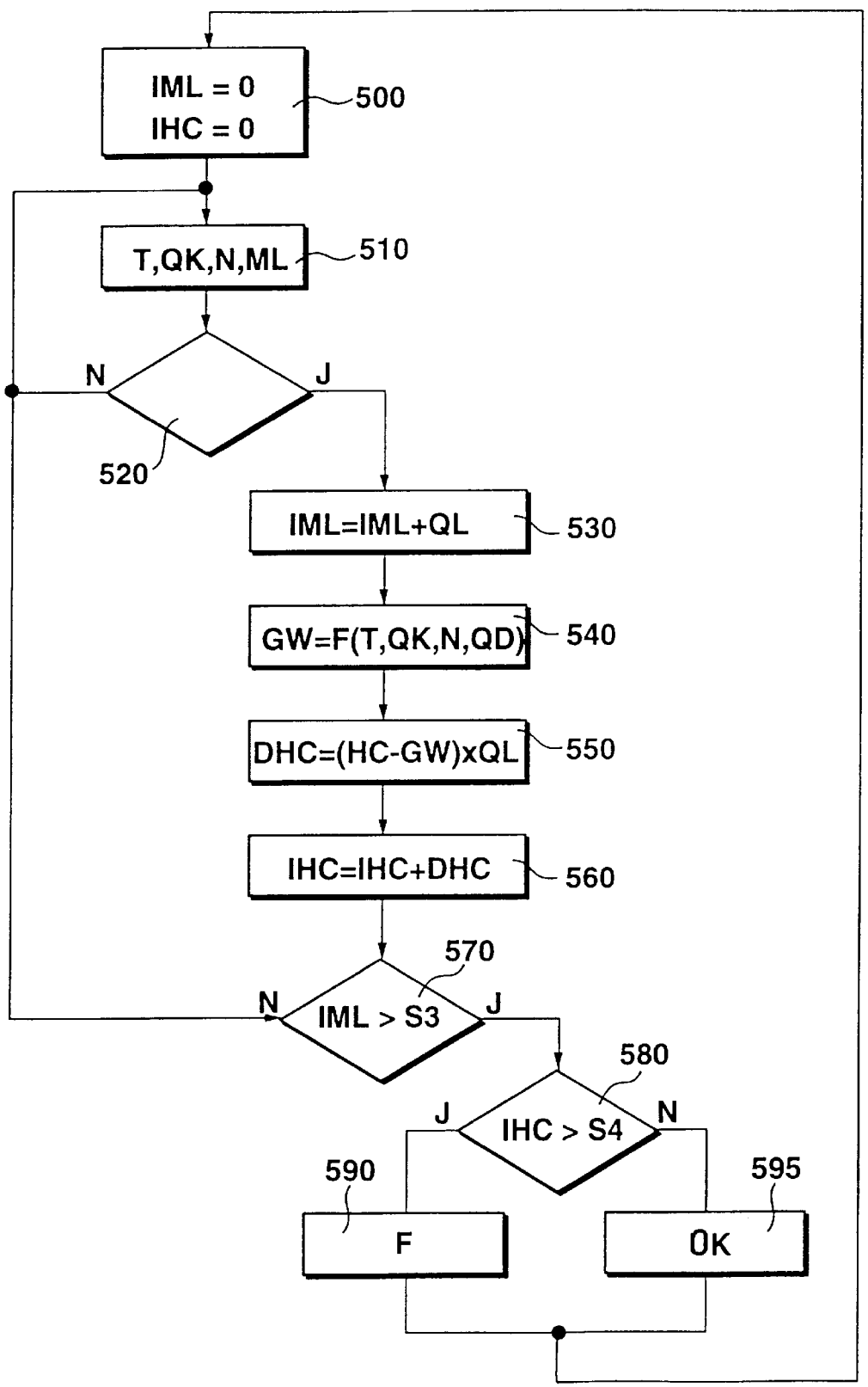
FIG. 5 shows a flow diagram of a second embodiment of the diagnosis method according to the present invention.

The method of functioning of the apparatus is described on the basis of the flow diagram according to FIG. 5. In a first step 500, the contents IML of the integrator 400 and the contents IHC of the integrator 410 are set to 0. In step 510, the various operating characteristics are detected. If the working range recognition device 200 recognizes, in the inquiry 520, that a certain operating range is not present, step 510 takes place again. If the working range recognition device 200 recognizes, in step 520, that certain operating ranges are present, the switching means 425 and 450 are activated, which has the result that in step 530, the output signal QL is integrated up in the integrator 400. Furthermore, in step 540, the characteristics field 210 determines the limit value GW as a function of the exhaust gas temperature T, the amount QK of fuel injected, the speed of rotation N, and the metering amount QD.

The difference between the value detected for the hydrocarbon concentration HC and the limit value GW is formed by the linking point 430. In the linking point 440, this value is multiplied by the amount QL of air. This calculation takes place in step 550. Subsequently, the integrator 410 integrates this value DHC up in step 560.

The processing unit 420 checks, in the inquiry 570, whether the contents IML of the integrator 400 exceed a threshold value S3. If this is not the case, step 510 takes place again. If this is the case, the processing unit 420 checks, in the inquiry 580, whether the contents IHC of the integrator 410 exceed a threshold value S4. If this is the case, a defect is detected in step 590; if this is not the case, the processing unit 420 recognizes, in step 595, that the catalytic converter is functioning properly.

In this embodiment, whether or not monitoring can take place is recognized on the basis of the exhaust gas temperature T, the injection amount QK, and the speed of rotation N. During the time during which monitoring is active, the air mass stream is added up in the integrator 400. A limit value GW is subtracted from the current measured hydrocarbon value HC. The limit value is formed via the characteristic fields of exhaust gas temperature T, injection amount QK, speed of rotation N. and metering amount QD. This difference between the measured hydrocarbon value HC and the limit value GW represents the difference in the pollutant content of the exhaust gas as compared with a properly functioning catalytic converter. The difference is multiplied by the current air mass stream. This therefore yields the current pollutant mass stream. During the monitoring time, this pollutant mass stream is added up in an integrator. The processing logic constantly checks whether the monitored air mass reaches a minimum value S3. If this is the case, checking takes place to determine whether the pollutant mass IHC has exceeded a maximum value S4. If this is the case, a defect is detected Depending on the form of the present invention, the test is only carried out once, after the vehicle is started. Alternatively, it can also be provided that the test starts again after every run-through.

Alternatively, it can also be provided that the exhaust gas temperature T is not measured directly, but rather is calculated from various operating parameters, via a temperature model.

Because of the counters and integrators, the monitoring device is very robust with regard to short-term incorrect functioning of the catalytic converter. The test method is particularly suited for being able to perform the test reliably even under unsteady driving conditions.

What is claimed is:

1. A method for monitoring a functioning of a catalytic converter of a self-ignition internal combustion engine, the method comprising the steps of:

providing a sensor for generating an output signal indicating a proportion of hydrocarbons in an exhaust gas of the internal combustion engine; and recognizing a defect in the catalytic converter as a function of the output signal of the sensor and at least one variable predetermined as a function of at least one operating characteristic of the internal combustion engine.

2. The method according to claim 1, further comprising the steps of:

determining a first variable which represents a first time duration during which a checking of the catalytic converter is capable of being performed;

determining a second variable which represents a second time duration during which the catalytic converter is functioning properly; and recognizing the defect in the catalytic converter as a further function of a comparison of the first variable and the second variable.

3. The method according to claim 2, wherein the checking of the catalytic converter takes place only if the at least one operating characteristic of the internal combustion engine is present.

4. The method according to claim 3, wherein the at least one operating characteristic of the internal combustion engine is determined as a function of at least a speed of rotation of the engine and an amount of fuel injected into the engine.

5. The method according to claim 1, wherein proper functioning of the catalytic converter is recognized if the proportion of hydrocarbons in the exhaust gas of the internal combustion engine does not exceed a threshold value.

6. The method according to claim 5, wherein the threshold value is dependent on at least one of an exhaust gas temperature, a fuel injection amount, a speed of rotation, and a fuel metering amount.

7. The method according to claim 2, wherein the defect in the catalytic converter is recognized if the first time duration and the second time duration deviate from one another by more than a predetermined value.

8. The method according to claim 1, wherein an amount of pollutants emitted is determined and the defect in the catalytic converter is recognized if the amount of pollutants emitted exceeds a predetermined threshold value.

9. The method according to claim 8, wherein the pollutant amount is dependent upon the proportion of hydrocarbons, at least one operating characteristics field value, and an air amount value.

10. An apparatus for monitoring a functioning of a catalytic converter of an internal combustion engine, the apparatus comprising:

a sensor for generating an output signal that indicates a proportion of hydrocarbons in an exhaust gas of the internal combustion engine; and an arrangement for recognizing a defect of the catalytic converter as a function of the output signal of the sensor and at least one variable predetermined as a function of at least one operating characteristic of the internal combustion engine.

* * * * *